(12) United States Patent
Kim et al.

(10) Patent No.: US 11,695,351 B2
(45) Date of Patent: Jul. 4, 2023

(54) TRIBOELECTRICITY-BASED ENERGY HARVESTING MATERIAL, SPRING INCLUDING SAME, AND METHOD OF MANUFACTURING SAME

(71) Applicant: KOREA ADVANCED INSTITUTE OF SCIENCE AND TECHNOLOGY, Daejeon (KR)

(72) Inventors: Seong Su Kim, Daejeon (KR); Hyunsoo Hong, Daejeon (KR); Muhammad Salmam Sarfraz, Daejeon (KR); Wonvin Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/580,187

(22) Filed: Jan. 20, 2022

(65) Prior Publication Data
US 2023/0029284 A1 Jan. 26, 2023

(30) Foreign Application Priority Data
Jul. 21, 2021 (KR) .................... 10-2021-0095712

(51) Int. Cl.
*H02N 1/04* (2006.01)
(52) U.S. Cl.
CPC .................... *H02N 1/04* (2013.01)
(58) Field of Classification Search
CPC ........................................ H02N 1/04
USPC .................................. 310/309, 310
See application file for complete search history.

(56) References Cited

U.S. PATENT DOCUMENTS

| 10,322,530 B2* | 6/2019 | Kawabe ............. B29C 43/30 |
| 2014/0300248 A1* | 10/2014 | Wang ................. H02N 1/04 310/300 |
| 2014/0338458 A1 | 11/2014 | Wang et al. |

FOREIGN PATENT DOCUMENTS

| KR | 10-1557070 | 10/2015 |
| KR | 10-2016-0076700 | 7/2016 |
| KR | 10-2018-0002267 | 1/2018 |
| KR | 10-2019-0072086 | 6/2019 |
| KR | 2020-0013953 | * 2/2020 |

OTHER PUBLICATIONS

WO2014166286; Hsu et al (Year: 2014).*
KR 101577541; Kim et al. (Year: 2015).*

* cited by examiner

*Primary Examiner* — Ahmed Elnakib

(57) ABSTRACT

Provided is a triboelectricity-based energy harvesting material including a first carbon composite layer, a second carbon composite layer, a first charge layer and a second charge layer applied onto the first carbon composite layer and the second carbon composite layer, respectively, and a spacer that is provided between the first charge layer and the second charge layer and maintains a predetermined interval between the first charge layer and the second charge layer, wherein the spacer is provided only in a partial region of the first charge layer and the second charge layer, and accordingly, the first charge layer and the second charge layer come into contact with each other according to deformation of the material in a region in which the spacer is not provided so as to generate triboelectricity.

8 Claims, 3 Drawing Sheets

TRIBOELECTRICITY-BASED ENERGY HARVESTING MATERIAL, SPRING INCLUDING SAME, AND METHOD OF MANUFACTURING SAME

CROSS-REFERENCE TO RELATED APPLICATION

This application claims priority of Korean Patent Application No. 10-2021-0095712, filed on Jul. 21, 2021, in the KIPO (Korean Intellectual Property Office), the disclosure of which is incorporated herein entirely by reference.

BACKGROUND OF THE INVENTION

Field of the Invention

The present disclosure relates to a triboelectricity-based energy harvesting material, a spring including the same, and a method of manufacturing the same, and more particularly, to a triboelectricity-based energy harvesting material that may improve the system efficiency of a robot by performing self-energy harvesting based on triboelectricity, a spring including the same, and a method of manufacturing the same.

Description of the Related Art

Wearable devices are electronic devices that a person directly wears and have been researched and developed in various fields such as smart watches, exoskeleton robots, and virtual reality (VR) devices in order to check a heath state of the person in real time or assist movement. In general, batteries having excellent portability are mainly used as power sources of the wearable devices. However, since the wearable devices become smaller and higher in performance, the batteries have limitations in terms of a usage time. Thus, in order to overcome this limitation, research related to energy harvesting which produces electrical energy from movement of the person is being actively carried out.

The exoskeleton robots are wearable device robots that the person directly wears to assist the movement of the person and have been spotlighted in various fields such as rehabilitation, military, industry, and leisure. In particular, in recent years, lower leg exoskeleton robots have been researched and developed through various studies in order to improve driving performance of the person. Since muscles and tendons of the person store and release elastic energy while being expanded and contracted according to driving, the lower leg exoskeleton robots may assist the roles of the muscles and the tendons, thereby further improving driving ability of the person. Thus, through various preceding studies, attempts have been made to improve the driving ability of the person by mounting springs that store and release the elastic energy to the lower leg exoskeleton robots.

The springs of the lower leg exoskeleton robots are constantly deformed according to the driving to store and release the elastic energy. When energy is harvested from the constant deformation of the springs caused by the driving of the person, mechanical energy that may be wasted may be reused to increase the overall system efficiency of the robots.

Korean Patent Application Publication No. 10-2016-0076700 introduces, as such an energy harvesting element, a technology using a composite-based energy harvesting device. However, a technology of directly collecting frictional energy generated by deformation during a motion of the person and using the collected frictional energy as an energy source for a motion of a robot has not been disclosed. In particular, a robot technology that senses the motion of the robot and collects deformation energy at the same time has not yet been disclosed.

SUMMARY OF THE INVENTION

The present disclosure is directed to providing an energy harvesting material capable of improving system efficiency of a robot by performing self-energy harvesting on the basis of triboelectricity, a spring using the same, and a method of manufacturing the same.

The present disclosure provides a triboelectricity-based energy harvesting material including a first carbon composite layer, a second carbon composite layer, a first charge layer and a second charge layer applied onto the first carbon composite layer and the second carbon composite layer, respectively, and a spacer that is provided between the first charge layer and the second charge layer and maintains a predetermined interval between the first charge layer and the second charge layer, wherein the spacer is provided only in a partial region of the first charge layer and the second charge layer, and accordingly, the first charge layer and the second charge layer come into contact with each other according to deformation of the material in a region in which the spacer is not provided so as to generate triboelectricity.

The first carbon composite layer and the second carbon composite layer may be made of carbon fiber-reinforced plastic, and the first charge layer and the second charge layer may be made of different materials.

The first carbon composite layer and the second carbon composite layer may be one or more selected from the group consisting of a unidirectional carbon fiber composite, a carbon fabric composite, and a short carbon fiber composite, and the first carbon composite layer and the second carbon composite layer may have a shape of a certain curvature.

The spacer may be made of a material that does not generate triboelectricity despite being in contact with the first charge layer and the second charge layer.

The present disclosure also provides a spring including the above-described triboelectricity-based energy harvesting material.

The spring may store elastic energy, which is generated when the spring is compressed, in the first carbon composite layer and the second carbon composite layer, then release the elastic energy again during recovery, and at the same time, generate triboelectricity due to the first charge layer and the second charge layer in contact with each other.

The present disclosure also provides a method of manufacturing the above-described triboelectricity-based energy harvesting material, the method including manufacturing first and second carbon fiber-reinforced polymer (CFRP) layers, forming first and second charge layers by applying different triboelectric materials to the first and second CFRP layers, applying a spacer to at least one of the first and second charge layers, and adhering the first and second CFRP layers, and the spacer may be stacked to be provided only in a partial region of the first and second charge layers.

The first and second CFRP layers may be CFRPs having a shape of a certain curvature, and the CFRP may be manufactured by performing hand lay-up on a metal mold, by impregnating epoxy or hand lay-up of a prepreg impregnated with epoxy in advance in a metal mold having a certain shape, and then by performing autoclaving or hot press molding.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
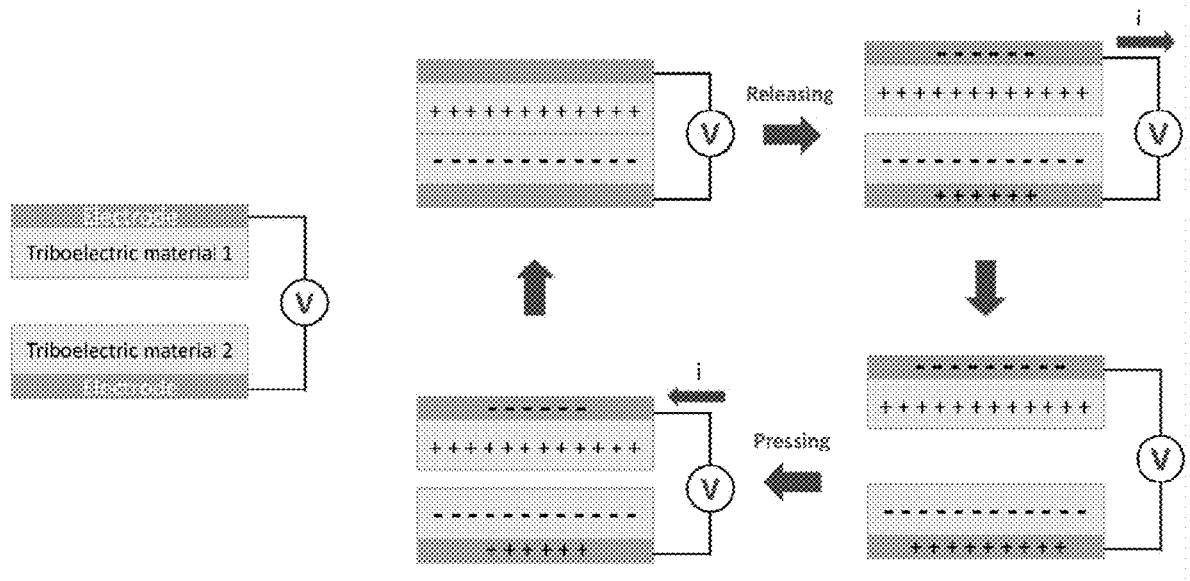
FIG. 1 is a schematic view for describing triboelectricity utilized in the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a triboelectricity-based energy harvesting material, a spring including the same, and a method of manufacturing the same according to the present disclosure will be described with reference to the accompanying drawings. Unless otherwise defined, all terms in the present specification have the same general meanings understood by those skilled in the art to which the present disclosure pertains, and when the general meanings conflict with the meanings of the terms used herein, the terms follow the definitions used herein. Further, detailed description of well-known functions and configurations, which may make the subject matter of the present disclosure unclear, will be omitted. Throughout the specification, when a part "includes" a component, this means that another component is not excluded but may be further included unless otherwise stated.

The present disclosure discloses an energy harvesting material using triboelectricity and a robot using the same. The triboelectricity used in the present disclosure means electricity generated when two different types of objects are rubbed against each other. The triboelectricity has two types of positive charge and a negative charge, and this means that, in friction between two objects, one thereof is charged with a positive charge (+), and the other thereof is charged with a negative charge (−).

FIG. 1 is a schematic view for describing triboelectricity utilized in the present disclosure.

Referring to FIG. 1, when two triboelectric materials are pressed against each other through physical deformation, one thereof is charged with a positive charge and the other one thereof is charged with a negative charge according to triboelectric series. Thereafter, when the two triboelectric materials become closer to each other or move away from each other, free electrons in an electrode move, thereby generating a current (see right side of FIG. 1).

Figure 2:
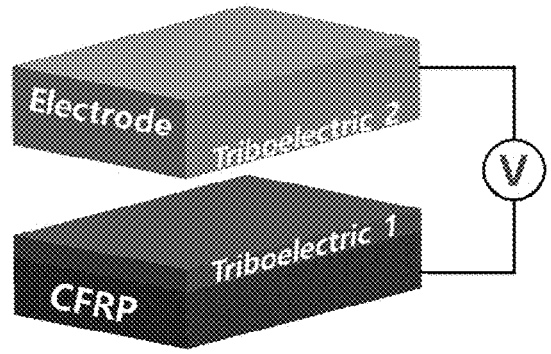
FIG. 2 is a schematic view of a system using a carbon fiber reinforced polymer (CFRP) as an electrode in a triboelectricity-based energy harvesting material.

FIG. 2 is a schematic view of a system using a carbon fiber reinforced polymer (CFRP) as an electrode in a triboelectricity-based energy harvesting material.

Referring to FIG. 2, as illustrated in FIG. 2, one of electrodes of a triboelectricity energy harvesting system is replaced with the CFRP. In this case, using a conductive CFRP as an electrode, energy harvesting using a triboelectric principle according to deformation of the conductive CFRP is used.

In this case, the effect of the energy harvesting may be identified. However, the advantages of the CFRP having excellent mechanical properties such as specific strength and specific stiffness are not utilized, and the CFRP is difficult to apply to real systems such as robots, shoes, wind power, and wave power.

Thus, to solve these problems, the present disclosure provides the CFRP that may be directly utilized in a robot system.

Figure 3:
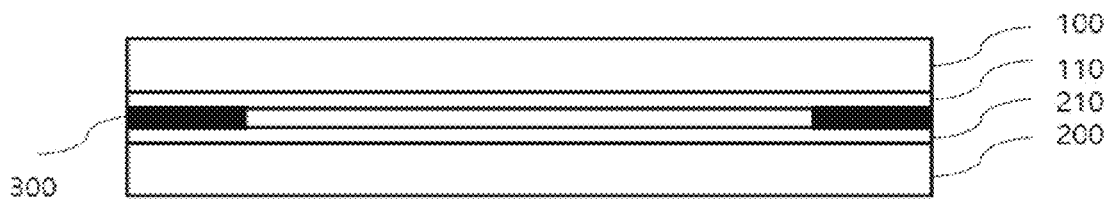
FIGS. 3 and 4 are a structural cross-sectional view and a schematic view of a CFRP spring capable of triboelectricity-based self-energy harvesting according to an embodiment of the present disclosure.
Figure 4:
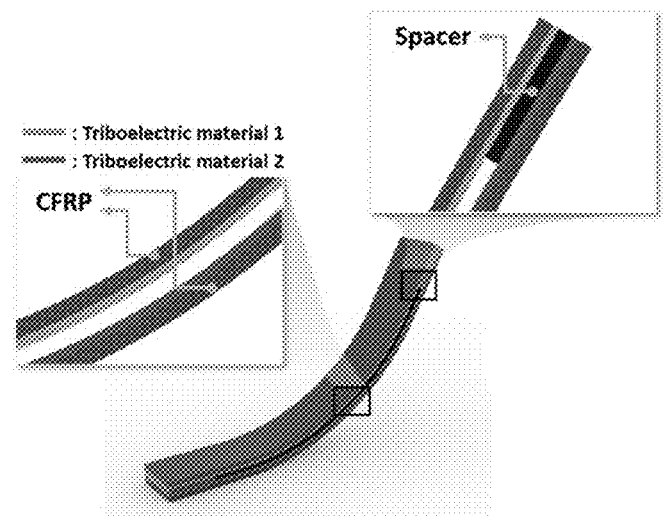

FIGS. 3 and 4 are a structural cross-sectional view and a schematic view of a CFRP spring capable of triboelectricity-based self-energy harvesting according to an embodiment of the present disclosure.

Referring to FIG. 3, a structure of a CFRP spring that stores and releases elastic energy, and at the same time, performs self-triboelectricity energy harvesting according to the embodiment of the present disclosure includes a first carbon composite layer 100 and a second carbon composite layer 200, wherein a first charge layer 110 and a second charge layer 210 facing each other are provided between the first carbon composite layer 100 and the second carbon composite layer 200.

A spacer 300 is provided at a portion of the first charge layer 110 and the second charge layer 210 to prevent direct electrical communication between the first and second charge layers 110 and 210 before the deformation. In the embodiment of the present disclosure, the spacer 300 is provided only in a partial region of the second charge layer 120, and accordingly, according to the deformation of the material, the first charge layer 110 and the second charge layer 120 come into contact with each other in a region in which the spacer 300 is not provided, thereby generating triboelectricity.

Thus, it is preferable that the spacer 300 is made of a material (for example, an insulating material) that prevents electrical communication between at least the first charge layer 110 and the second charge layer 210 so as not to generate triboelectricity, and is provided at an end of the charge layers 110 and 210 in the embodiment of the present disclosure. However, all types and sizes of the spacer 300 belong to the scope of the present disclosure as long as the spacer 300 includes at least a structure in which, before the deformation, triboelectricity is not generated in a portion in which the spacer 300 is not present but the two charge layers 110 and 210 come into contact with each other at a certain level of the deformation, thereby generating triboelectricity.

In the present disclosure, the CFRP that may have elasticity and thus store and release elastic energy is utilized as an electrode, the charge layers (first charge layer 110 and second charge layer 210) that may generate triboelectricity are provided therebetween, and thus triboelectricity may be generated during the deformation and may be directly collected. Accordingly, the energy efficiency of used components (for example, a spring) can be maximized by generating an energy harvesting effect as well as storing/utilizing elastic energy.

In the embodiment of the present disclosure, the carbon composite is the CFRP, but the scope of the present disclosure is not limited thereto. That is, the carbon composite is all predetermined carbon materials having elasticity and conductivity, and for example, the first carbon composite layer 100 and the second carbon composite layer 200 may be one selected from the group consisting of a unidirectional carbon fiber composite, a carbon fabric composite, and a short carbon fiber composite.

Figure 5:
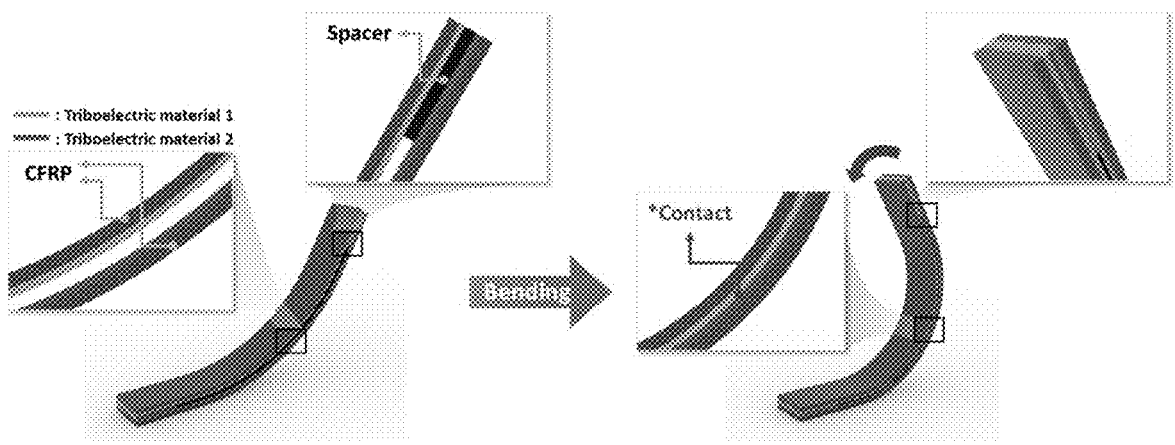
FIG. 5 is a structural schematic view according to an operation of a triboelectricity energy harvesting system according to the embodiment of the present disclosure.

FIG. 5 is a structural schematic view according to an operation of a triboelectricity energy harvesting system according to the embodiment of the present disclosure.

Referring to FIG. 5, in the embodiment of the present disclosure, to have a shape of a certain curvature, the CFRP serving as an electrode is manufactured by hand lay-up of a carbon fiber on a metal mold, by impregnating epoxy or hand lay-up of a prepreg impregnated with epoxy in advance in a metal mold having a certain shape, and then by performing autoclaving or hot press molding. In the case of a spring, since a certain curvature is required, the CFRP in the embodiment of the present disclosure is manufactured while having a certain curvature.

In the embodiment of the present disclosure, two CFRPs serving as electrodes of the triboelectricity-based energy harvesting material are manufactured for each unit material. Thereafter, different triboelectric materials adhere to the manufactured CFRPs. In this case, the adhesion may be achieved through adhesive application, an adhesive film, simultaneous curing, or the like. Further, the CFRP material and the spring using the same capable of self-energy harvesting are manufactured by locating two spacers in partial regions (both ends) between the two CFRPs to which the triboelectric material adheres, and then adhering the two spacers under a certain curing condition.

The CFRP manufactured with the above-described structure stores and releases elastic energy while being bent and deformed. Further, as contact and non-contact occur between different triboelectric materials facing each other due to the bending deformation of the structure, electrical energy is generated using the triboelectric principle.

That is, as the spacers are located at both ends, the triboelectricity is not generated due to the non-contact in a state in which there is no deformation (see the left side of FIG. 5). However, when the deformation occurs and the two charge layers come into contact with each other and rub against each other, the triboelectricity is generated. Accordingly, the generated triboelectricity flows to the outside through the two CFRP materials and charges a battery (not illustrated) or the like (see the right side of FIG. 5).

Figure 6:
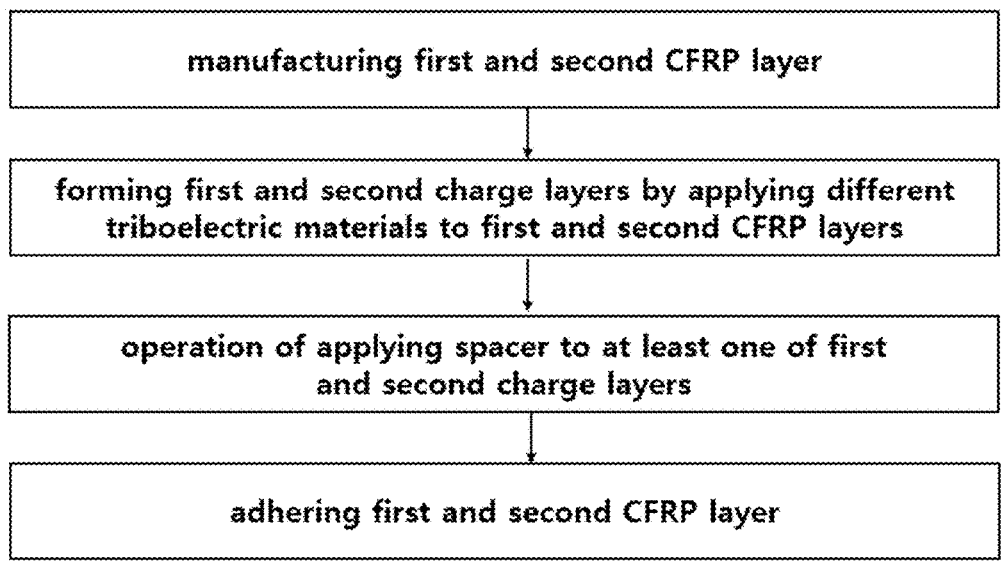
FIGS. 6 and 7 are a flowchart and a schematic view of a method of manufacturing a triboelectricity-based energy harvesting material according to the embodiment of the present disclosure.
Figure 7:
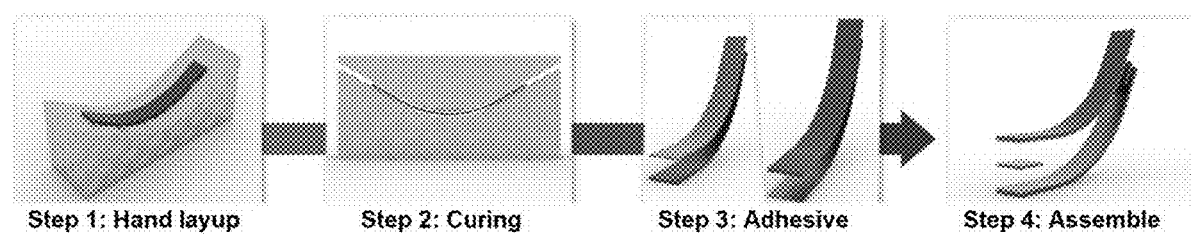

FIGS. 6 and 7 are a flowchart and a step-by-step schematic view of a method of manufacturing a triboelectricity-based energy harvesting material according to the embodiment of the present disclosure.

Referring to FIGS. 6 and 7, the first and second CFRP layers are manufactured.

Thereafter, the triboelectricity-based energy harvesting material is manufactured by applying different triboelectric materials to the first and second carbon fiber reinforced composite layers to form the first and second charge layers, applying the spacer to at least one of the first and second charge layers, and finally adhering the first and second CFRP layers to each other.

When the method of manufacturing the CFRP layer according to the embodiment of the present disclosure is described in more detail, first, a carbon fiber is hand-laid up on a metal mold having a certain shape, and then epoxy is impregnated or the prepreg of the CFRP impregnated with epoxy is hand-laid-up. Thereafter, autoclave molding or hot press molding is performed on the basis of a certain curing condition to manufacture the respective CFRPs.

Thereafter, different triboelectric materials adhere to the CFRP, and thus transfer layers having different material types are formed on the respective CFRP layers.

Thereafter, the triboelectricity-based energy harvesting material-based spring illustrated in FIGS. 3 and 4 is manufactured by stacking the spacer having a certain interval between the transfer layers in a partial region of one or two charge layers, and then adhering the two CFRP layers.

The two CFRP layers and the two charge layers described in the present disclosure are one unit energy harvesting element, and as illustrated in FIG. 7, the triboelectricity-based energy harvesting system may be implemented in which the above-described unit energy harvesting elements are successively stacked. In this case, when composite layers to which the triboelectricity charged with a positive charge adheres and composite layers to which the triboelectricity charged with a negative charge are connected to each other, more charges are transferred while contact and non-contact occur therebetween due to the bending deformation of the structure, and thus the energy harvesting having higher performance may be performed. That is, when the structure of the CFRP capable of self-energy harvesting is appropriately designed according to the application field and the environment, the energy harvesting having a higher performance may be implemented.

When a triboelectricity-based energy harvesting material according to the present disclosure is utilized in a deformable component such as a spring, elastic energy is stored and released, and at the same time, electric energy can be harvested using a structure itself without an additional energy harvesting system. Further, a composite spring is manufactured using a carbon fiber reinforced polymer (CFRP) as an electrode for energy harvesting, and thus, weight reduction can be implemented, and at the same time, excellent mechanical properties can be secured. Therefore, the corresponding structure can be utilized as an ankle spring of an exoskeleton robot for driving, can serve to store and release the elastic energy, can assist driving performance, at the same time, can harvest the electric energy from deformation of the spring according to driving, and thus can improve the efficiency of an entire robot system.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims. The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A triboelectricity-based energy harvesting material comprising:
    a first carbon composite layer;
    a second carbon composite layer;
    a first charge layer and a second charge layer applied onto the first carbon composite layer and the second carbon composite layer, respectively; and
    a spacer provided between the first charge layer and the second charge layer, and maintains a predetermined interval between the first charge layer and the second charge layer,
    wherein the spacer is provided only in a partial region of the first charge layer and the second charge layer, and accordingly, the first charge layer and the second charge layer come into contact with each other according to bending deformation of the triboelectricity-based energy harvesting material in a region in which the spacer is not provided so as to generate triboelectricity.

2. The triboelectricity-based energy harvesting material of claim 1, wherein the first carbon composite layer and the second carbon composite layer are made of carbon fiber-reinforced plastic.

3. The triboelectricity-based energy harvesting material of claim 1, wherein the first charge layer and the second charge layer are made of different materials.

4. The triboelectricity-based energy harvesting material of claim 1, wherein the first carbon composite layer and the second carbon composite layer are one or more selected from the group consisting of a unidirectional carbon fiber composite, a carbon fabric composite, and a short carbon fiber composite.

5. The triboelectricity-based energy harvesting material of claim 1, wherein the first carbon composite layer and the second carbon composite layer have a shape of a certain curvature.

6. The triboelectricity-based energy harvesting material of claim 1, wherein the spacer is made of a material that does not generate triboelectricity despite being in contact with the first charge layer and the second charge layer.

7. A spring including the triboelectricity-based energy harvesting material of claim 1.

8. The spring of claim 7, wherein the spring stores elastic energy, which is generated when the spring is compressed, in the first carbon composite layer and the second carbon composite layer, then releases the elastic energy again during recovery, and at the same time, generates triboelectricity due to the first charge layer and the second charge layer in contact with each other.

* * * * *

UNITED STATES PATENT AND TRADEMARK OFFICE
CERTIFICATE OF CORRECTION

| | | |
|---|---|---|
| PATENT NO. | : 11,695,351 B2 | Page 1 of 1 |
| APPLICATION NO. | : 17/580187 | |
| DATED | : July 4, 2023 | |
| INVENTOR(S) | : Seong Su Kim et al. | |

It is certified that error appears in the above-identified patent and that said Letters Patent is hereby corrected as shown below:

On the Title Page

Item (72) "Inventors":
Please correct "Muhammad Salmam Sarfraz" to read --Muhammad Salman Sarfraz--.

Signed and Sealed this
Second Day of September, 2025

Coke Morgan Stewart
*Acting Director of the United States Patent and Trademark Office*